United States Patent [19]
Chen

[11] Patent Number: 6,030,285
[45] Date of Patent: Feb. 29, 2000

[54] DEVICE FOR DISSIPATING HEAT FROM A CAR

[76] Inventor: Chin-Sung Chen, P.O. Box 82-144, Taipei, Taiwan

[21] Appl. No.: 09/223,791

[22] Filed: Dec. 31, 1998

[51] Int. Cl.[7] ............................... B60H 1/24; B60H 3/06
[52] U.S. Cl. ........................... 454/75; 454/128; 454/131; 454/162; 454/164; 454/200; 454/286; 454/900; 236/51
[58] Field of Search ............................... 165/41; 454/128, 454/131, 132, 133, 162, 200, 286, 164, 142, 900, 75; 236/51; 62/244

[56] References Cited

U.S. PATENT DOCUMENTS

| | | | |
|---|---|---|---|
| 1,742,290 | 1/1930 | Stark | 454/132 |
| 2,501,273 | 3/1950 | Goetz | 454/128 |
| 3,275,224 | 9/1966 | Bush | 454/200 |
| 3,804,157 | 4/1974 | Wenig | 454/286 |
| 4,899,645 | 2/1990 | Wolfe et al. | 454/900 |
| 4,942,806 | 7/1990 | Hwang | 454/900 |
| 4,986,169 | 1/1991 | Chen | 454/131 |
| 5,044,258 | 9/1991 | Wu et al. | 454/131 |
| 5,099,752 | 3/1992 | Bosley | 454/131 |
| 5,148,736 | 9/1992 | Juang | 454/142 |
| 5,525,107 | 6/1996 | Shao | 454/200 |
| 5,637,039 | 6/1997 | Chiu et al. | 454/200 |
| 5,687,573 | 11/1997 | Shih | 62/244 |
| 5,733,190 | 3/1998 | Wahab | 454/162 |

*Primary Examiner*—John K. Ford
*Attorney, Agent, or Firm*—A & J

[57] ABSTRACT

A device for dissipating heat from a car and having discharge ports the angle of which is adjustable. The device includes a body, an air discharge rotary cylinder having discharge ports, a fan blade shaft, and a securing device. The body is comprised of left and right casings that together define upper and lower cylindrical receiving chambers for receiving the rotary cylinder and the fan blade shaft respectively. The securing device includes a wedge-shaped insert plate and an elastic clamp plate. The insert plate extends downwardly from the bottom of the body and is adapted to insert into a gap between a window glass pane and a window frame of a car, with the clamp plate clamping against the car door. The body is connected via a main body to a car window drive circuit. Before the driver enters the car, the window can be lowered using a remote controller and the fan blade shaft in the body can be actuated to begin drawing out the hot air inside the car to thereby lower the temperature inside the car. The rotary cylinder is provided with a trigger rod that is exposed on the outside of the body and can be manipulated to rotate the rotary cylinder to thereby change the angle of the air discharge ports thereon.

3 Claims, 5 Drawing Sheets

DEVICE FOR DISSIPATING HEAT FROM A CAR

BACKGROUND OF THE INVENTION

1. Field of the Invention

The present invention relates generally to a device for dissipating heat from a car, and more particularly to a device capable of drawing out hot air from the car and having air discharge ports the angle of which is adjustable.

2. Description of the Prior Art

The number of cars has been on the rise, and car parking is indeed a problem. If the car is parked on the roadside without any shelter to protect it from the sun's heat, the air inside the car will become very hot and stuffy. Hence, there have been available on the market many types of sun-shielding devices, such as sun-shielding fabrics and protective covers that are adapted to cover the car to help protect it from the sun. However, such covers are inconvenient and time-consuming to use in covering the car, especially when the distances between the car and adjacent cars are short. Some cars are equipped with blinds or suns screens to help block out the sun. However, the effect is not significant.

SUMMARY OF THE INVENTION

The present invention relates generally to a device for dissipating heat from a car, and more particularly to a device capable of drawing out hot air from the car and having air discharge ports the angle of which is adjustable.

A primary object of the present invention is to provide a device for dissipating heat from a car, which can effectively dispel the hot air inside the car before the driver enters it.

Another object of the present invention is to provide a device for dissipating heat from a car, the device including air discharge ports the angle of which is adjustable.

In order to achieve the above-mentioned objects, the device according to the present invention comprises a body, an air discharge rotary cylinder, a fan blade shaft, and a securing device. The body includes upper and lower cylindrical receiving chambers that accommodate the rotary cylinder and the fan blade shaft respectively. The securing device includes a wedge-shaped insert plate and an elastic clamp plate. The insert plate is adapted to insert into a gap between a car window glass pane and the window frame, with the clamp plate clamping against the car door to thereby stabilize the body on the car door. The body is further connected via a main body to a car window drive circuit. Before the driver enters the car, he/she can lower the car window using a remote controller and simultaneously actuate the body to start drawing out the hot air inside the car. The rotary cylinder disposed inside the body has a trigger rod projecting therefrom, which can be manipulated to turn the rotary cylinder so that the angle of the discharge of hot air is adjustable.

DETAILED DESCRIPTION OF THE PREFERRED EMBODIMENT

Figure 1:
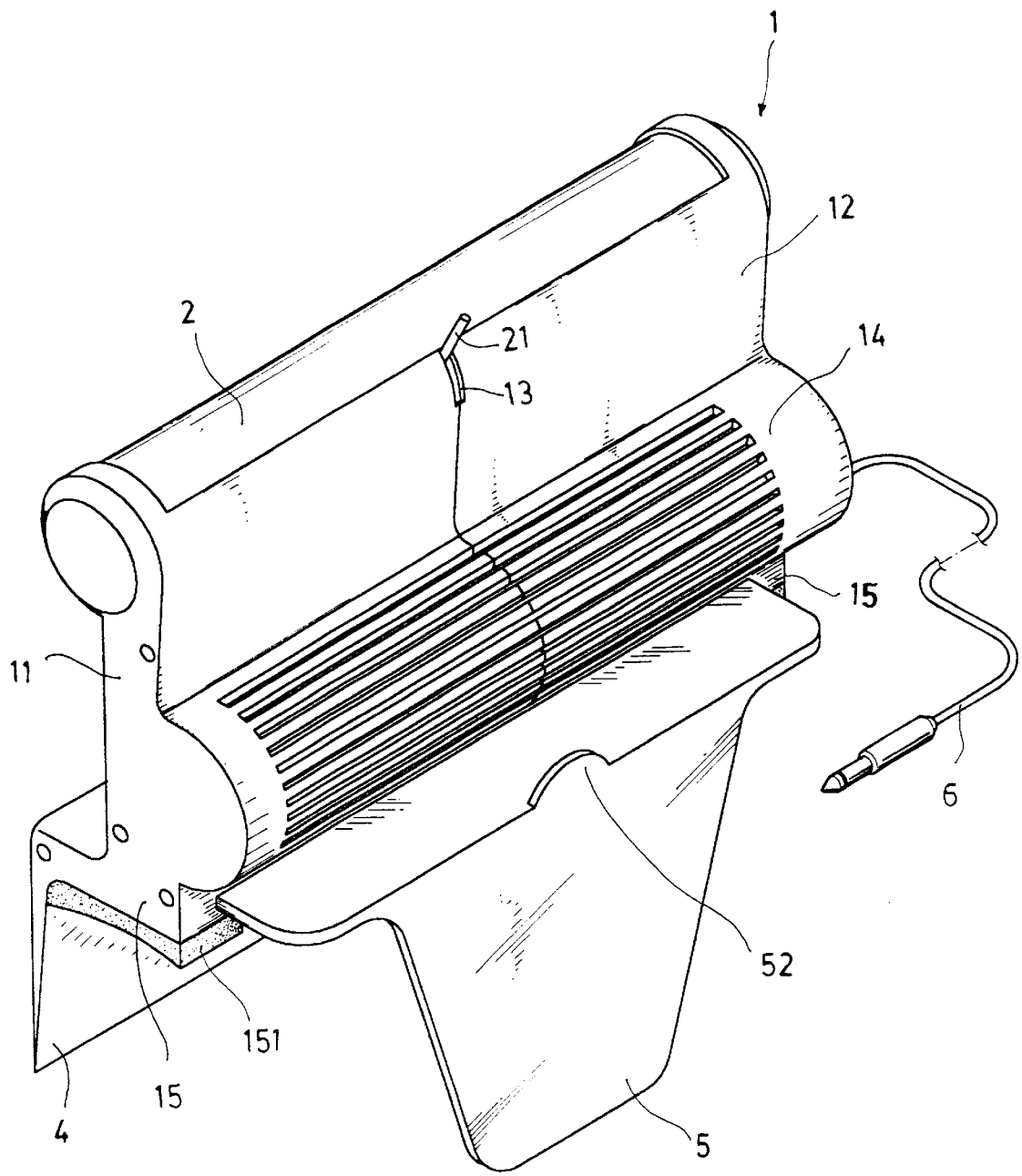
FIG. 1 is a perspective schematic view of the present invention.
Figure 2:
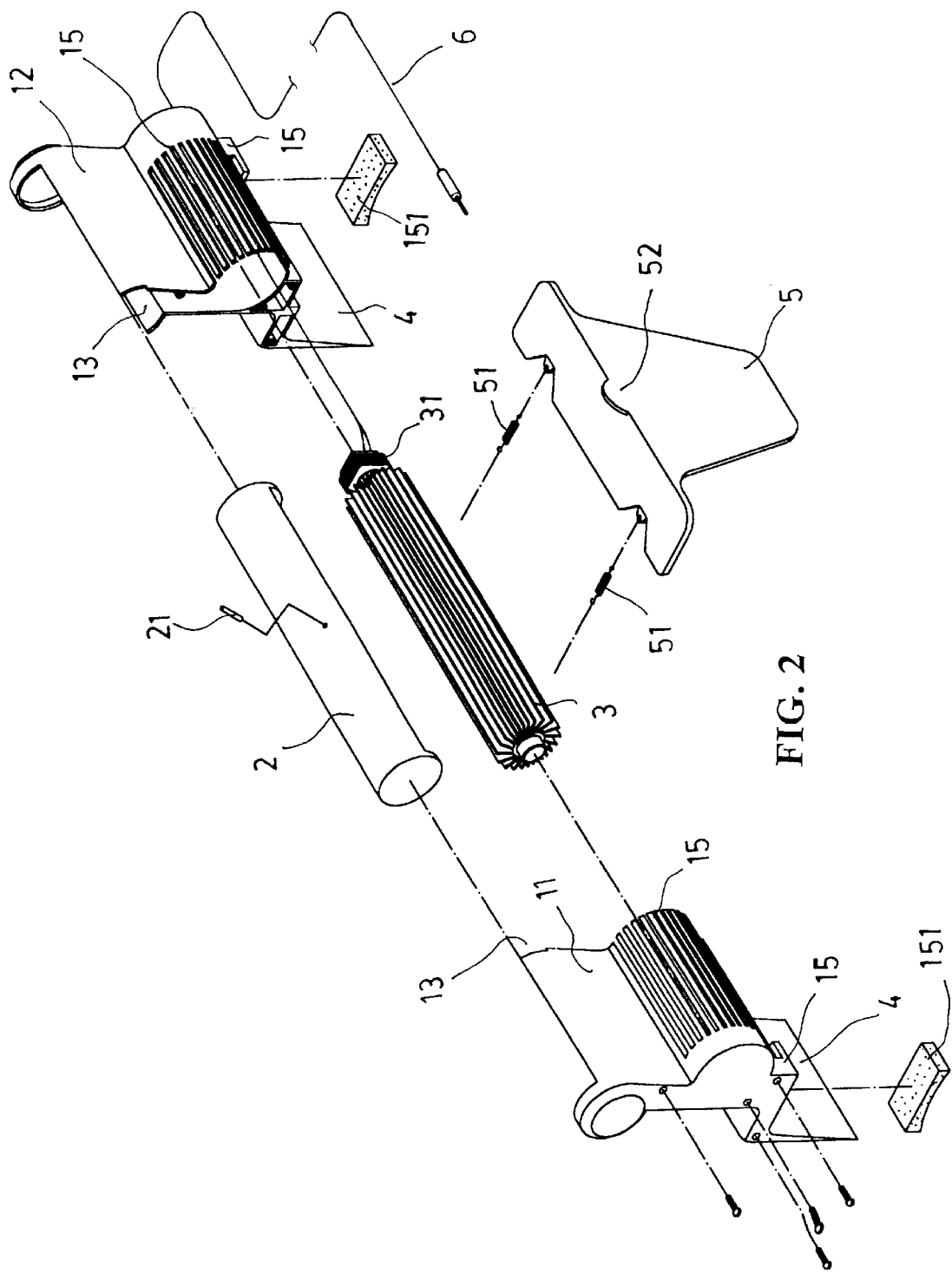
FIG. 2 is a perspective exploded schematic view of the present invention.

With reference to FIGS. 1 and 2, the present invention essentially comprises a body 1, an air discharge rotary cylinder 2, a fan blade shaft, and a securing device. The body is comprised of left and right casings 11, 12 defining a hollow receiving chamber. An upper portion of the receiving chamber receives the air discharge rotary cylinder 2, whereas a lower portion thereof accommodates the fan blade shaft 3. The fan blade shaft 3 includes a plurality of fan blades projecting radially from a shaft portion along a longitudinal direction and is driven by a motor 31 disposed at one end thereof. An upper surface of the rotary cylinder 2 is provided with a protrudent trigger rod 21 that goes through a curved slide slot 13 formed on the surface of the body 1 such that it can displace slidably in the slide slot 13 to achieve rotation of the rotary cylinder 2. The body 1 is further provided with a plurality of spaced elongate slots 14 arranged in a row at where the fan blade shaft 3 is accommodated. When the fan blade shaft 3 rotates at a high speed, hot air inside the car can be drawn in from these elongate slots 14.

The securing device is substantially located below the body 1 and includes a wedge-shaped insert plate 4 and a clamp plate 5 that are mounted opposite to each other. The clamp plate 5 has an inverted-L shape. Two sides of the bottom portion of the body 1 are provided with opposed clamp seats 15 adapted to receive both sides of a horizontal portion of the clamp plate 5 that can displace slidably therein. A front edge of the horizontal portion is provided with a plurality of expansion springs 51 that are connected to the body 1 so that the clamp plate 5 will not become detached from the body 1. The clamp plate 5 is further provided with a pull tab 52 so that the clamp plate 5 can be pulled out to a suitable distance. In addition, the bottom portions of the clamp seats 15 have respective plastic blocks 151 fixedly provided thereon. The body 1 is further connected by a wire 6 to a main body 7 provided with control circuits (see FIG. 5).

Figure 3:
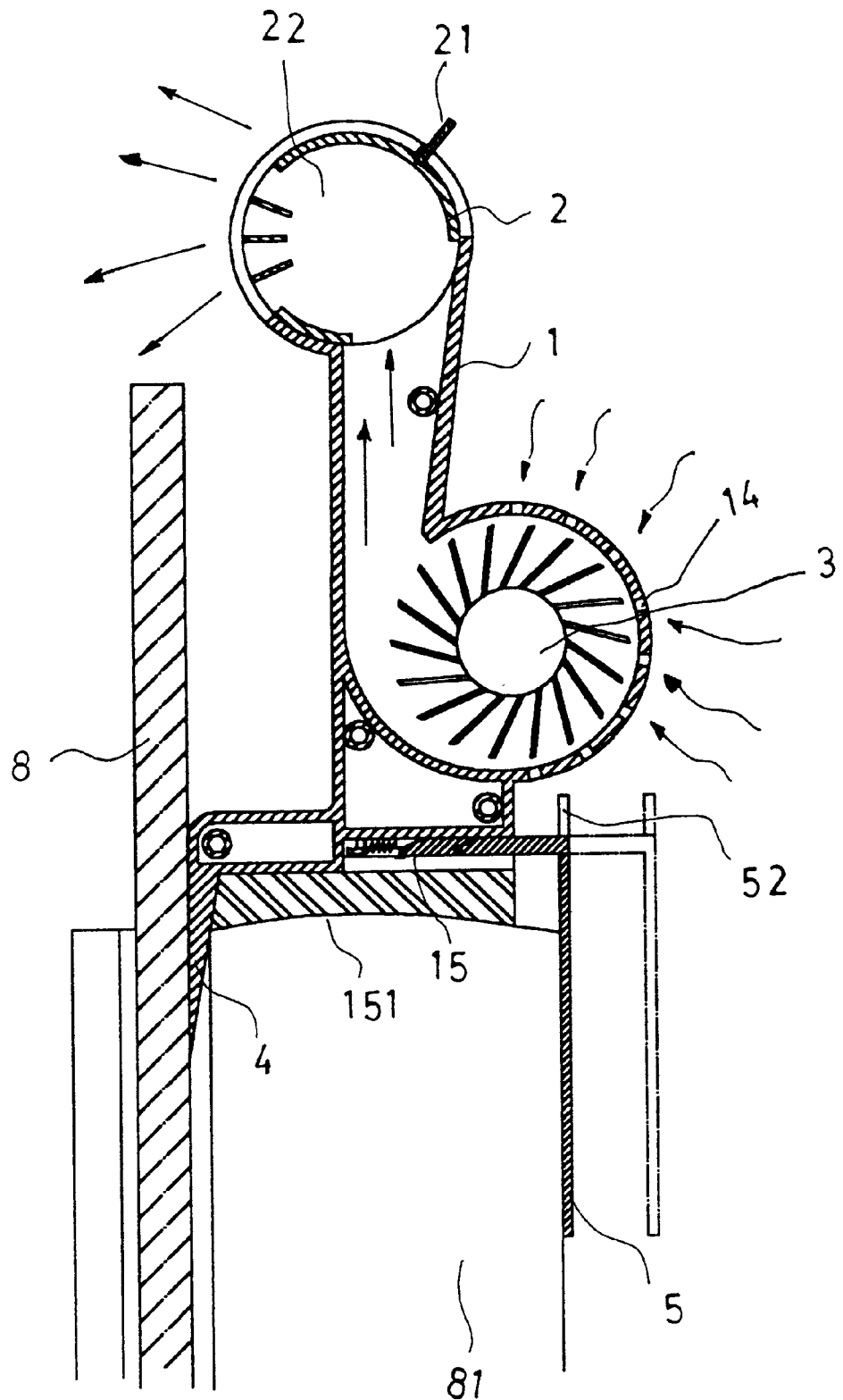
FIG. 3 is an assembled sectional view of the present invention when mounted on a car door.
Figure 4:
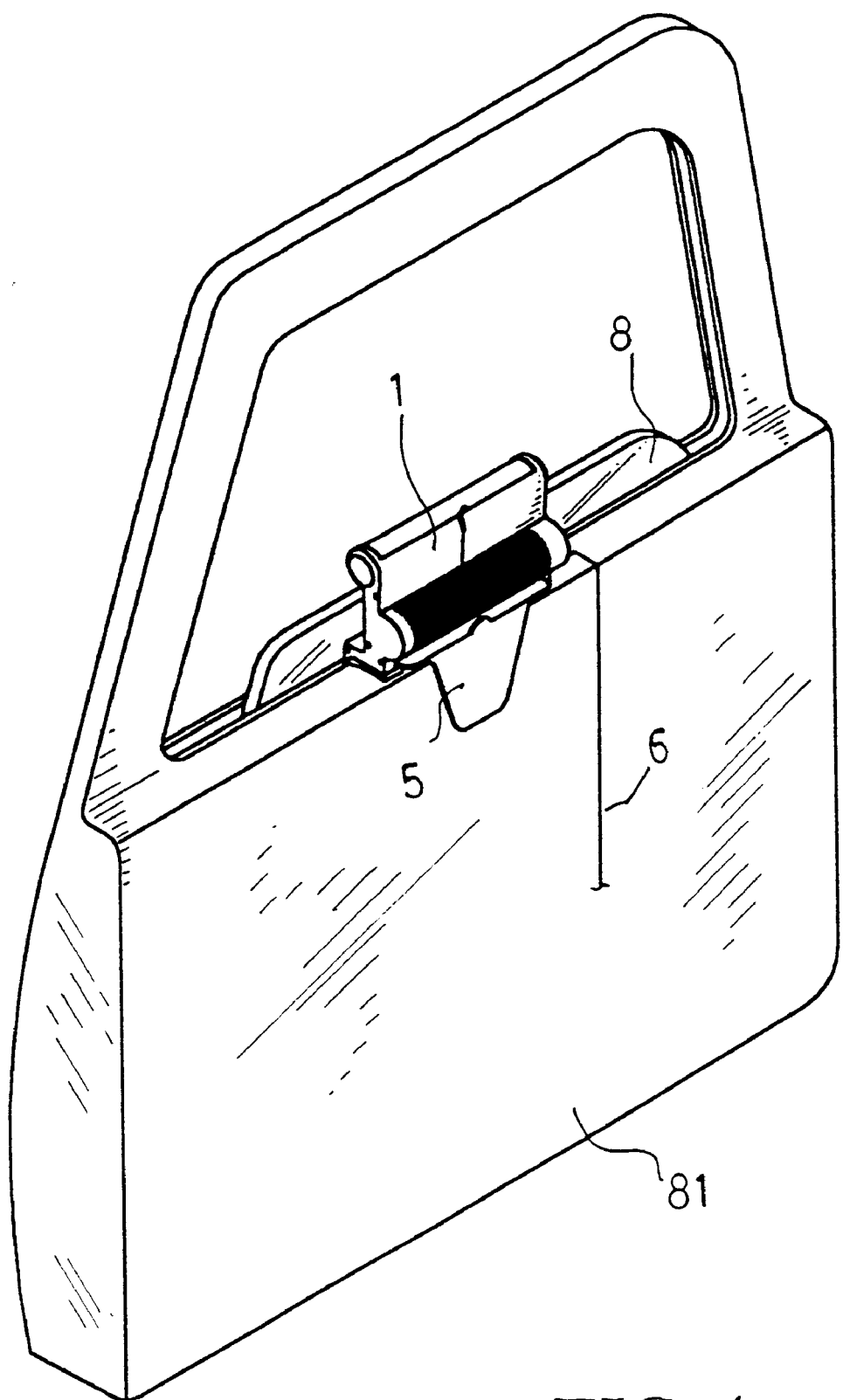
FIG. 4 is a perspective schematic view of the present invention mounted on the car door.

Referring to FIGS. 3 and 4, the body 1 of the present invention may be mounted on a car door 8, with the insert plate 4 at the bottom of the body 1 inserted into a gap between the window glass pane 8 and the window frame. In addition, as the clamp plate 5 is connected to the body 1, it can clamp the car door 81 elastically to thereby secure the present invention thereon. It can also be seen from FIG. 3 that the fan blade shaft 3 communicates with the rotary cylinder 2, and that the part of the rotary cylinder 2 exposing on the outside of the body 1 is provided with a plurality of discharge ports 22, whereby when the fan blade shaft 3 rotates at a high speed, the hot air inside the car can be induced through the elongate slots 14 to be discharged via the discharge ports 22 to the outside. If the window glass pane 8 is at a relatively high position and obstructs the discharge ports 22, the trigger rod 21 can be utilized to cause the rotary cylinder 2 to rotate so that the angle of the discharge ports 22 can be adjusted to achieve smooth discharge of hot air from the car.

Figure 5:
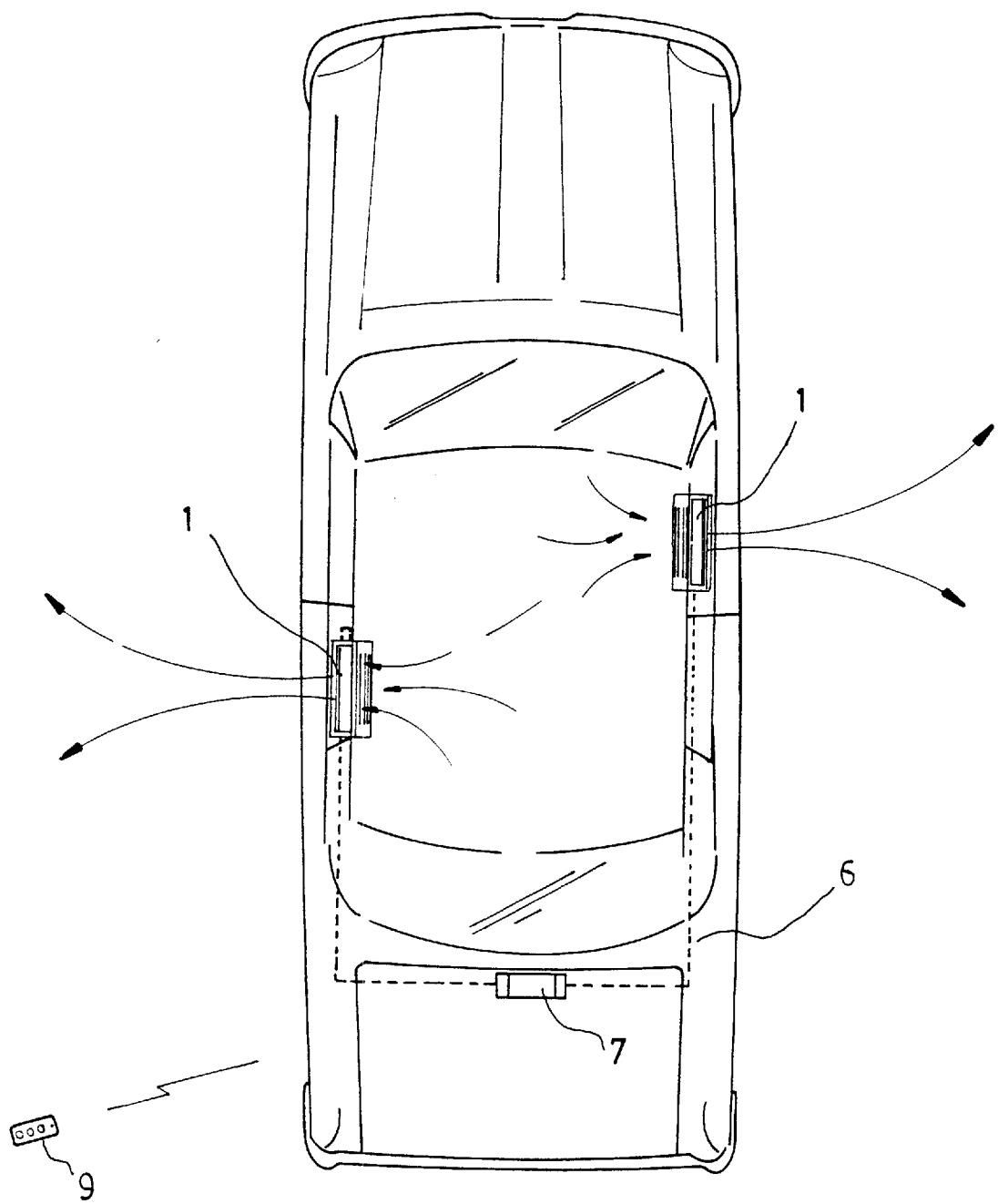
FIG. 5 is a schematic view illustrating operation of the present invention in drawing out hot air inside a car.

Referring to FIG. 5, which shows that the body 1 is installed on the car door, the wire 6 is connected to the main body 7 provided with control circuits. The main body 7 is further connected to a car window drive circuit. In use, the driver can lower the window glass panes 8 to lower using a remote controller before going into the car, so that the body 1 starts discharging the hot air inside the car to thereby lower the temperature inside the car.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A device for dissipating heat from a car, said device having discharge ports the angle of which is adjustable and comprising:

a body that is comprised of left and right casings which together define a hollow interior, upper and lower portions of which receive an air discharge rotary cylinder and a fan blade shaft respectively, said body being provided with a plurality of spaced elongate slots along a longitudinal direction thereof at where said fan blade shaft is, said body being further provided with a curved slide slot, one end of said body being externally connected to a power source wire, both sides of a bottom portion of said body being provided with opposite clamp seats;

said air discharge rotary cylinder, one portion thereof being within the upper portion of the hollow interior of said body and having a suitably large opening such that said air discharge rotary cylinder can communicate with said fan blade shaft, the other portion being exposed on the outside of said body and being provided with a plurality of discharge ports, both ends of said air discharge rotary cylinder being clamped by said body such that it may rotate therein, said air discharge rotary cylinder further having a trigger rod projecting from its surface that passes through said slide slot of said body;

said fan blade shaft, having a plurality of fan blades projecting radially from a shaft portion thereof along a longitudinal direction;

a securing device that includes a wedge-shaped insert plate extending downwardly from the bottom portion of said body and an elastic clamp plate, said clamp plate having an inverted L-shape and including a horizontal portion and a vertical portion, both sides of said horizontal portion being held in said clamp seats of said body, said clamp plate having expansion springs provided at a front edge thereof for connecting said clamp plate to the bottom portion of said body so that said clamp plate can be held in an elastic state, whereby said body may be secured on a car door and is connected by said power source wire to a main body that is provided with a control circuit, said main body being connected to a car window drive circuit so that, before the driver goes into the car, he/she can lower the car window using a remote controller and actuate said body to start drawing out the hot air inside the car to thereby lower the temperature of the car, said trigger rod of said air discharge rotary cylinder being controllable to adjust the angle of said discharge ports.

2. The device as claimed in claim 1, wherein said clamp seats of said body are respectively provided with a plastic block to enhance the stability of said body.

3. The device as claimed in claim 1, wherein said clamp plate is further provided with a pull tab between said horizontal portion and said vertical portion to facilitate pulling of said clamp plate.

* * * * *